United States Patent
Staal et al.

[11] Patent Number: 6,109,012
[45] Date of Patent: Aug. 29, 2000

[54] HAY-MAKING MACHINE

[75] Inventors: Nanno Geert Staal, Maasland; Maarten Koorn, Schiedam; Alfonsus Jacobus van den Engel, Vlaardingen, all of Netherlands

[73] Assignee: Maasland, N.V., Maasland, Netherlands

[21] Appl. No.: 09/024,969

[22] Filed: Feb. 6, 1997

Related U.S. Application Data

[63] Continuation of application No. PCT/NL97/00314, Jun. 4, 1997.

[30] Foreign Application Priority Data

Jun. 7, 1996 [NL] Netherlands ............................ 1003292

[51] Int. Cl.⁷ .................................................. A01D 78/10
[52] U.S. Cl. ............................................. 56/367; 172/311
[58] Field of Search .............................. 56/370, 367, 365, 56/372, 380, 381, 384, 385, 396, 397, 377; 172/776, 311, 501

[56] References Cited

U.S. PATENT DOCUMENTS

| | | | |
|---|---|---|---|
| 4,148,174 | 4/1979 | Mathews et al. | 56/504 X |
| 4,171,022 | 10/1979 | Applequist | 172/311 |
| 4,615,397 | 10/1986 | Hastings | 172/776 |
| 4,893,682 | 1/1990 | Smallacombe | 172/311 |
| 4,996,833 | 3/1991 | Von Allowerden | 56/367 |

Primary Examiner—Robert E. Pezzuto
Attorney, Agent, or Firm—Penrose Lucas Albright

[57] ABSTRACT

A hay-making machine comprising motor-driven working members which rotate about upwardly orientated shafts. The working members are divided into three groups arranged in rows extending transversely to the direction of travel of the machine. A central group is at the rear of the machine and two outboard groups extend outwardly from a location forward of the central rear group in such a manner that the inner working member of each outboard group overlaps (as seen in the direction of travel) the outer working member of the central rear group. The machine includes a frame on which the three groups of working members are mounted. Each group includes four working members. The outer two working members of the outboard groups are foldable to a position over the two inner working members of each of these groups about horizontal axes. Then the outboard groups, as so folded, can be pivoted about vertical axes so that they are positioned along side the frame. The outer working members of the central rear group can be pivoted about horizontal axes extending in the direction of travel of the machine by ninety degrees whereby the machine, in its transport position, is less than about three meters in width compared to its working width of about twelve meters in width.

53 Claims, 8 Drawing Sheets

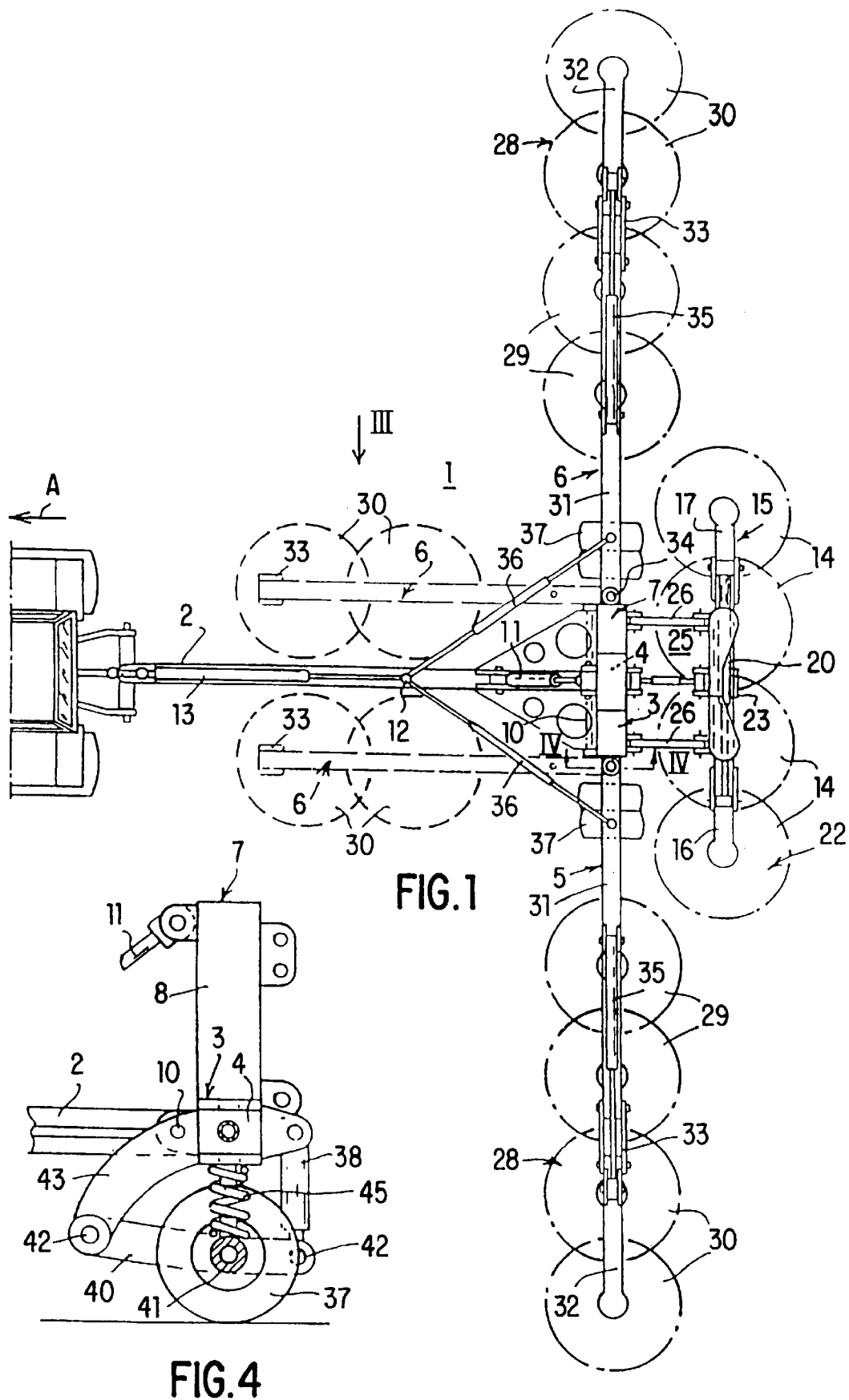

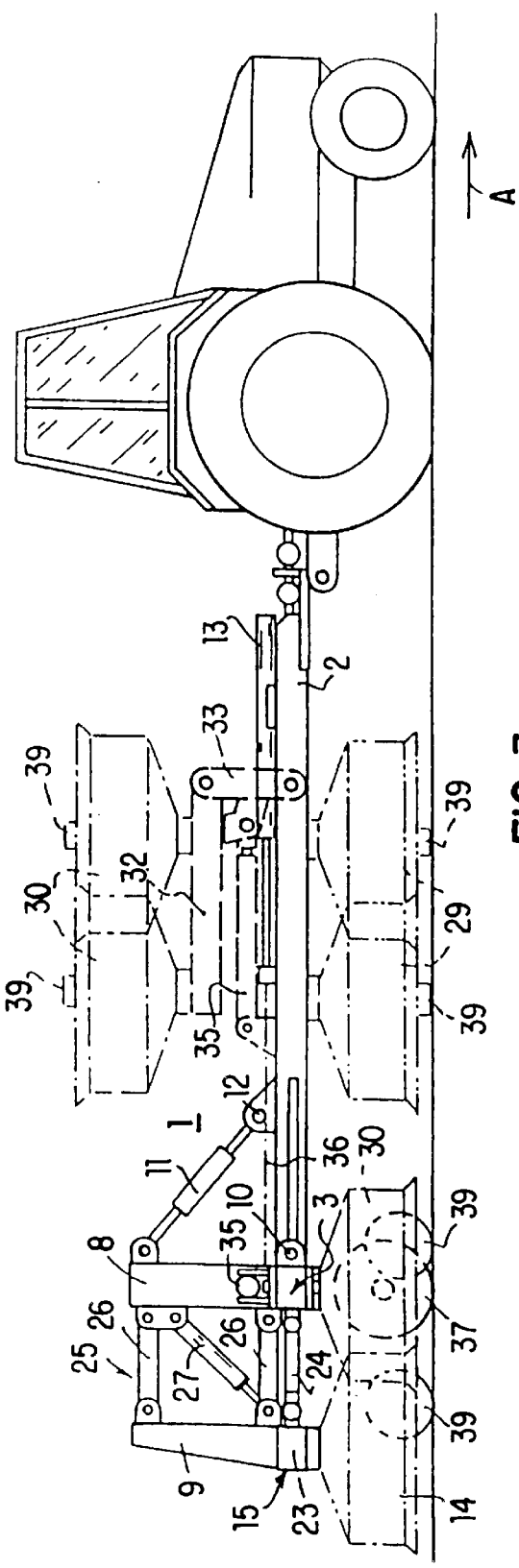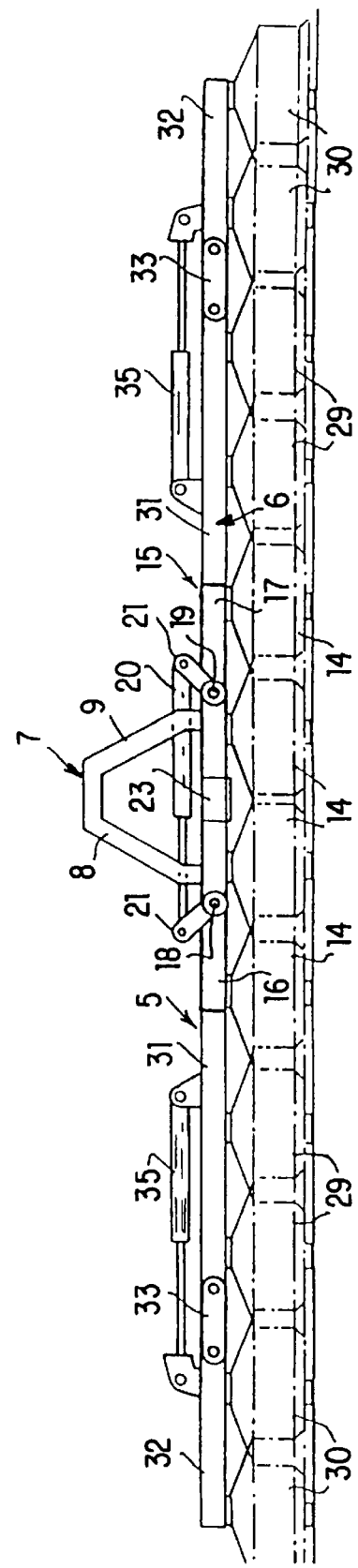

HAY-MAKING MACHINE

RELATED APPLICATION

This is a continuation of International Application No. PCT/NL97/00314, filed Jun. 4, 1997.

FIELD OF THE INVENTION

The invention relates to a hay-making machine comprising a number of motor-driven working members rotating about upwardly orientated shaft, which working members are divided into three groups that are arranged in rows extending transversely to the direction of travel of the machine, of which three groups, the two outer ones viewed in the direction of travel of the machine are located at the side of a third group and at some distance therefrom.

BACKGROUND OF THE INVENTION

Such a machine is known from the Dutch publication 9400133. In said publication a hay-making machine is disclosed consisting of three parts, each of which is provided with groups of working members.

These three groups of working members form together a hay-making machine having a very large width. The groups are divided into a middle group which is coupled to the rear of a tractor, and two groups treating strips of soil located at the sides of the middle group. To that end the groups located on the sides are carried by a frame disposed at the front side of the machine by means of two arms extending transversely to the direction of travel. These arms consist of hingeable portions so that it is possible to pivot the working members upwards in such a manner that the working members are adjusted into a transport position and the width of the machine is reduced to a considerable extent.

SUMMARY OF THE INVENTION

An object of the invention is to provide a hay-making machine having a large working width and an uncomplicated construction, the outer groups of working members of said machine being adapted to be adjusted into the transport position in a simple manner. In accordance with the invention this is achieved in that the machine includes a frame on which the three groups of working members are mounted, of which three groups the outer ones comprise more than three members, and in that the machine is capable of being adjusted into a transport position wherein at least one working member of an outer group is pivotable in height, relative to at least one other working member of said group, about a shaft extending at least substantially in the direction of travel, while, viewed in the direction of travel, the whole group is pivotable in forward directions about a vertical shaft in such a manner that the width of the machine is reduced. In accordance with a further aspect of the invention, viewed in the direction of travel of the implement, the third group is located rearwardly of the other groups. In accordance with another aspect of the invention, the outer groups comprise more than three working members and the machine is capable of being adjusted into a transport position in that at least one working member of the outer groups is upwardly pivotable, relative to at least one other working member of said group, about a shaft extending at least substantially in the direction of travel, while both groups, viewed in the direction of travel, are pivotable in forward directions in such a manner that the width of the machine is reduced.

This construction has the advantage that the three groups of working members are adapted to be mounted on one frame which is capable of being drawn by a tractor.

It is to be noted that to pivot groups of working members about upwardly orientated shafts is known. But that in this case the working members, viewed in the direction of travel of the machine, are not pivoted forwardly but in rearward direction, which has proved to be undesirable during transport. An embodiment of such a construction is described in the European patent EU-0053570.

In accordance with a favorable embodiment of the invention, the pivotable working members of the two outer groups of working members, which working members are located on the outside, are pivotable about two pivot shafts which, in the operative position of the machine, extend at least substantially in the direction of travel, so that said working members are located, after being pivoted into the transport position, above the other working members of the group.

According to a further embodiment of the invention, both the outer group and the group located in the middle comprise a corresponding unit of three working members of which the outer working member is pivotable in upward direction. Said construction has the advantage that the corresponding groups of working members can be manufactured as units.

The invention will be explained in further detail on the basis of two embodiments.

BRIEF DESCRIPTION OF THE DRAWINGS

FIG. 1 is a schematic plan view of a first embodiment of the hay-making machine in accordance with the invention;

FIG. 2 is a rear elevational view of the machine;

FIG. 3 shows a side view according to the arrow III in FIG. 1;

FIG. 4 its a side view in which a supporting part of the machine is shown in detail;

DETAILED DESCRIPTION OF THE PREFERRED EMBODIMENTS

Figure 5:
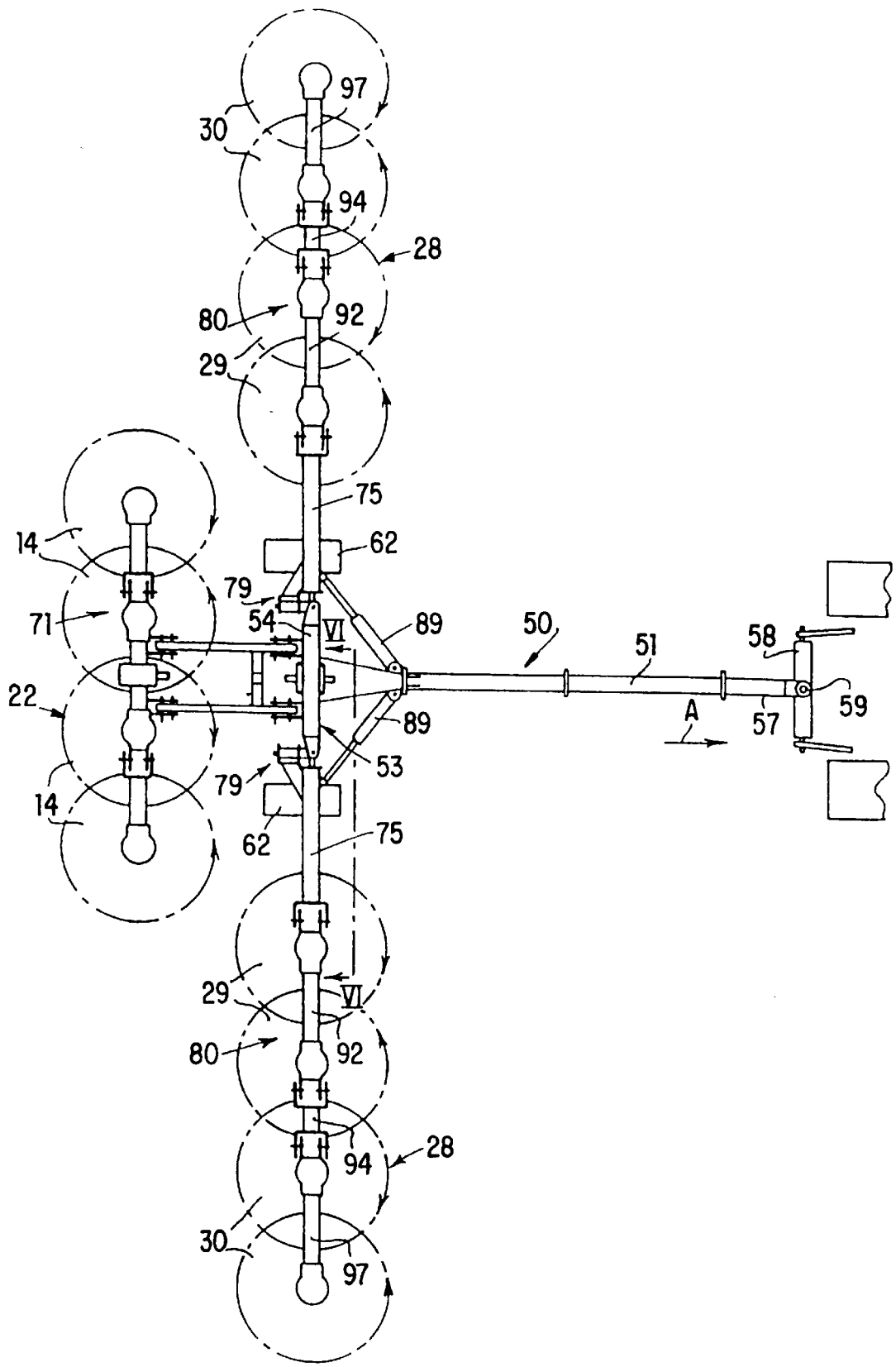
FIG. 5 represents, in a schematic plan view, the operative positions of an alternative embodiment of the machine according to the invention.
Figure 6:
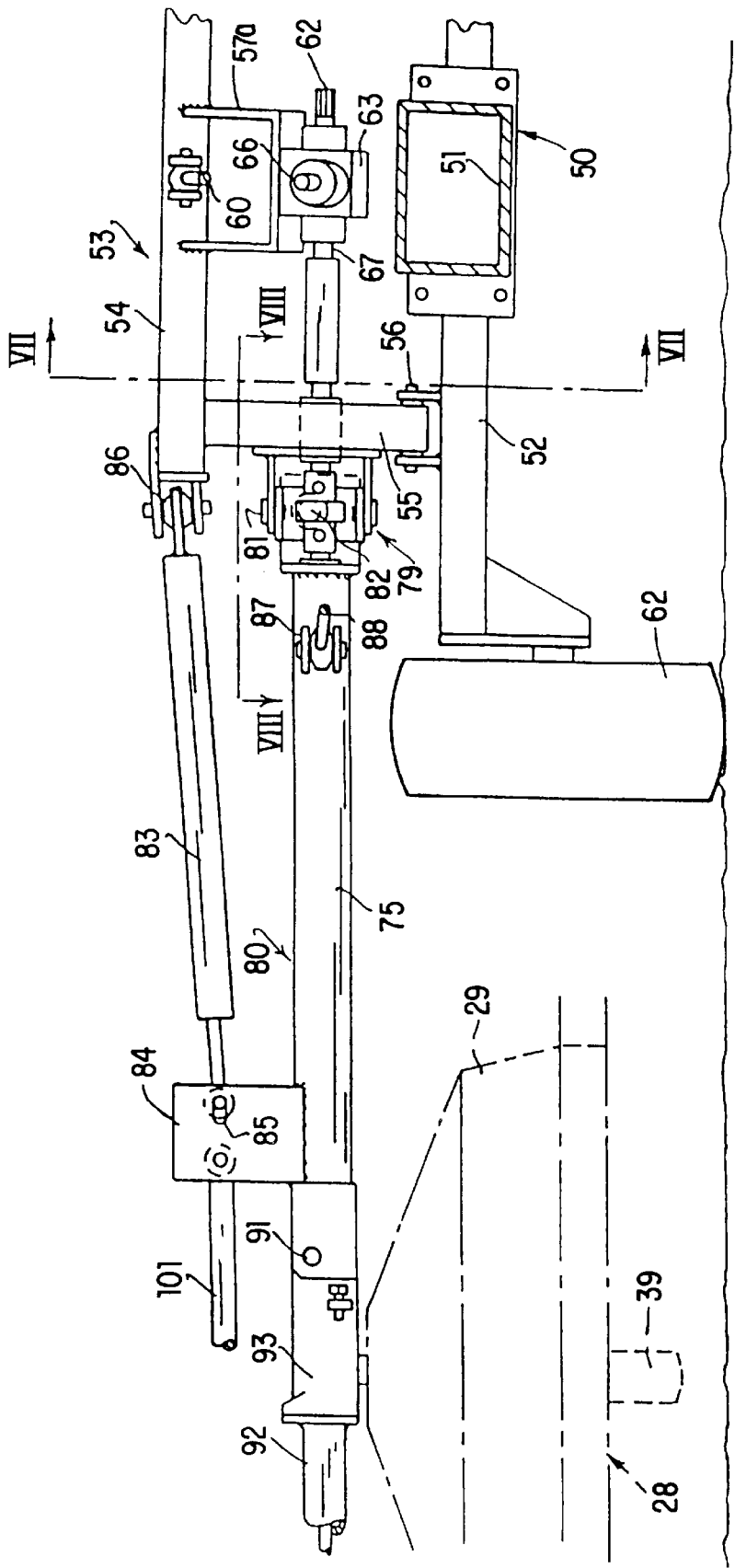
FIG. 6 is a view taken on line VI—VI in FIG. 5.

The hay-making machine in accordance with the invention includes a frame 1 consisting of a frame beam 2 extending in the direction of travel A of the machine, which frame beam 2 is adjoined by a frame beam 3 extending transversely to the direction of travel. Frame beam 3 comprises a gearbox 4 includes two sidepieces 5 and 6.

A trestle 7 is fastened to frame beam 3. Trestle 7 is provided with legs 8 and 9 extending obliquely downwards such that, seen from behind., the trestle has the form of an inverted V. Together with frame beam 3, trestle 7 is coupled to frame beam 2 by means of a hinge pin extending at least substantially horizontally transversely to the direction of travel.

The upper side of trestle 7 is coupled to a hinge point 12 on the frame beam 2 by means of an adjusting element 11, in this case constituted by a hydraulic adjusting piston and cylinder unit, by means of which trestle 7 is capable of pivoting about hinge pin 10.

At the rear side of the machine there is a rearward and central group 22 of four working members 14 which, in practice, are also designated as rake wheels, raking members or rotors. These working members are rotatable about upwardly orientated rotation shafts and are located on a line that extends transversely to the direction of travel A. For the purpose of carrying working members 14, central group 22 includes a frame beam 15 on which there are disposed two working members 14, while the outer working members 14 are disposed on frame portions 16 and 17 capable of pivoting about shafts 18 and 19 extending in the direction of travel A. To that end the group 22 of working members 14 comprises a horizontal hydraulic piston and cylinder unit 20 engaging arms 21 of frame portions 16 and 17.

Frame beam 15 comprises a gearbox 23 which is coupled with a shaft of gearbox 4 by means of an intermediate shaft 24. On frame beam 15 of the central group 22 there is provided a trestle 25. Said trestle 25 is coupled with trestle 7 by means of pivot arms 26. Between trestle 7 and trestle 25 is a hydraulic piston and cylinder member 27 by means of which trestle 25 can be adjusted in height relative to trestle 7; this upward movement is partly due to the fact pivot arms 26, i.e. one centrally located upper pivot art and two lower pivot arm 26 each positioned at the side thereof, located between trestle 7 and trestle 25, form, in side view, a pivotable parallelogram. The drive of working members 14 takes place in a known manner by means of a drive shaft which is located in frame beam 15 and frame portions 16 and 17 and which extends towards the gearboxes, which have square transmissions, to all working members 14.

The outer groups of working members 28 each consist of four working members 29 and 30, subdivided into pairs of inner working members 29 and pairs of outer working members 30. Working members 29 and 30 correspond to working members 14 of the central group 22. The inner working members 29 are carried by a common frame beam portion 31 and the outer working members 30 are carried by a frame beam portion 32. Both frame beam portions are coupled with each other in a hinged manner by means of an intermediate beam portion 33. Frame beam portion 31 is coupled in a hinged manner with the frame beam 3 via a hinge connection 34. Said hinge connection 34 comprises a vertical hinge and a horizontal hinge. Frame beams 31 and 32 are engaged by a hydraulic piston and cylinder unit 35, by means of which frame beam 32 can be pivoted relative to frame beam 31 in such a manner that it is possible for frame beam 32 to be located approximately parallel to and above frame 31. Moreover, frame beam 31 is coupled with frame beam 2 by means of adjustable drawbars 36 and via central adjusting element 13. By energizing the hydraulic piston and cylinder unit 13, it is possible to pivot frame beam 31 and consequently the groups of rake wheels 29 and 30 so that, by pivoting about the vertical shaft of hinge 34, they are positioned at least approximately parallel to the direction of travel beside frame beam 2. This applies both for the left and the right groups of working members 28.

In the operative position, the groups of working members 28 are arranged in such a manner that working members 30, which are located closest to frame beam 2, are overlapping the outer working members 14 of central group 22 as viewed in the direction of travel, which overlap approximately corresponds to that of the working members within each of the groups 22 and 28. Seen in the direction of travel, either the tangent plane at the circle circumscribed by the tines of the outermost rake member is located closer to the frame beam 2 than a similar tangent plane for the tines of the outermost rake member of the central group 22, or the respective tangent plane coincide.

Under the frame beam 3 are located wheels 37 arranged in the direction of travel A at a mutual distance transversely to the direction of travel A, which wheels are capable of being adjusted in height by means of a hydraulic piston and cylinder element 38. Running wheels 37 are supported by arms 40 on which the running wheels are disposed so as to be freely rotatable about horizontal rotation shafts 41. Arms 40 are mounted on carriers 43 of frame beam 3 so as to be freely pivotable about horizontal shafts 42.

At the rear side each of arms 40 is pivotally coupled to a hydraulic piston and cylinder element 38 which is coupled at its upper side to frame beam 3 in a hinged manner. At rotation shafts shaft 41, each of the running wheels 37 is supported by a spring 45. For that purpose journals are disposed against frame portion 2 and on arms 40, which journals center spring 45. During operation, the running wheels are capable of resiliently supporting the machine, to which end hydraulic piston and cylinder element 38 is capable of being adjusted into an unloaded position. However, by means of hydraulic piston and cylinder element 38, the machine can be lifted relative to wheels 37 for the purpose of adjusting the machine into the transport position.

Under working members 14, 29 and 30 there are located self-adjusting running wheels 39. The drive of the working members 14, 29 and 30 extends in a known manner via drive shafts which extend through the frame beams on which the relative working members are disposed. Above each working member there is located, in a manner known per se, a gearbox having a square transmission, by means of which the relevant working members 14, 29 and 30 can be rotated in such a manner that the working members are rotating in opposite directions and the outer working members of the groups of working members are rotating, at their front sides, towards the middle of the relevant group. Centrally on frame portion 2 central gearbox 4 which is capable of being coupled via intermediate shafts to the power take-off shaft of a tractor and which comprises one or more square transmissions, i.e. outgoing journals, for the drives of the groups 22 and 28.

Figure 11:
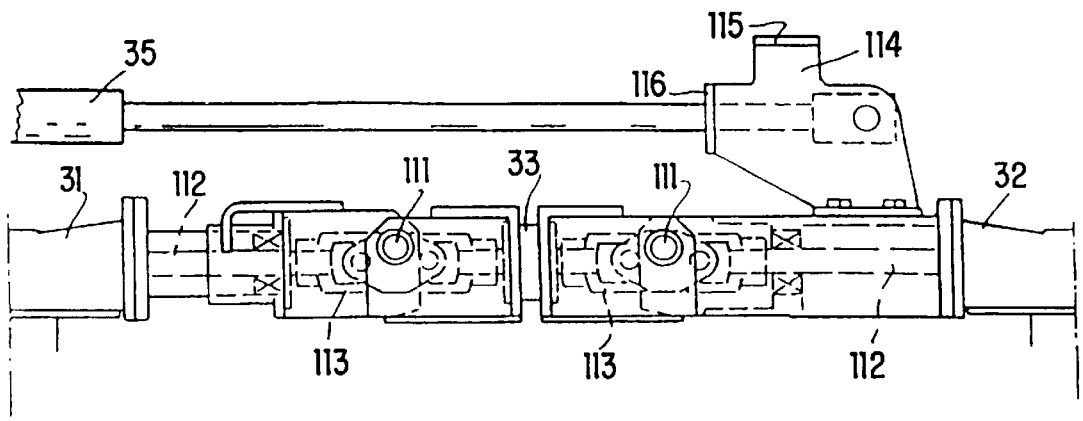
FIG. 11 shows a detail of FIG. 2.

Near the various hinge connections between the frame beams, the drive shafts may comprise so-called wide angle universal joints which maintain, irrespective of pivoting of the working members as a result of unevenness of the ground, the drive to be preserved, but which become inoperative when the working members are pivoted into the transport position. An alternative for the wide-angle universal joints will be explained in what follows with reference to FIGS. 11 and 12.

The hydraulic piston and cylinder of the machine are adapted to be operated from the tractor drawing the machine.

The function of the implement is as follows:

During operation the machine functions as a tedder and has in the present embodiment a working width of approximately 12.5 meters. By means of the running wheels 39 under the working members 14, 29 and 30, the working members follow unevennesses of the ground, while they are capable of pivoting about the various pivot shafts between the frame portions. When the machine is rearranged into a transport position, first wheels 37 are adjusted in height in such a manner that frame 1 is positioned higher from the ground and, when the hydraulic piston and cylinders 20 and 35 of the working member groups 22 and 28 have been locked, the working members of all groups are lifted from the ground as well. In view of the forwardly tilted position of the working members 14, 29 and 30 during operation, it may be desirable to pivot trestle 7 somewhat rearwards. Subsequently the outer working members of the group of working members 14 located in the middle are pivoted upwardly so that said working members are located within the largest size of the inner working members of this group. Afterwards the outer working members 30 are pivoted in such a manner that they are located above the working members 29 (FIG. 3), whereafter the outer groups of working members 28 are pivoted forwardly so that they are located beside the frame beam 2. In this manner, the machine obtains a transport width of less than three meters and is moved forward during transport on wheels 37. The present machine has, inter alia, the advantage that, by disposing the working members 29 and 30 in pairs on a frame beam portions 31 and 32, a transport position is obtained in a relatively simple and advantageous manner, while the mutual cooperation of the pairs of working members 29 and 30 is preserved and while, partly due to the intermediate frame portions 33, there is maintained a proper adaptation to the ground.

FIGS. 5 to 10 show another embodiment of the invention. Parts of the hay-making machine in this embodiment corresponding to those of FIGS. 1 to 4 are indicated by the same reference numerals.

The machine includes a frame 50 provided with a frame beam 51 extending in the direction of travel of the machine, which frame beam is fastened to a frame beam 52 extending transversely to the direction of travel. On frame beam 52 is mounted a trestle 53. Said trestle 53 consists of a crossbeam 54 and two beams 55 extending upwardly which are disposed on beam 52 about horizontal cross-shafts 56. At its front side, frame beam 51 is provided with a coupling element 57 which is extends in an obliquely downward direction. For the purpose of coupling the machine to a tractor, a coupling beam 58 is fastened to said coupling element 57 so as to be capable of hinging freely about a vertical shaft 59. Coupling 58 is provided with a coupling element, in the present embodiment constituted by journals disposed at the ends of the beam 58, by means of which journals the machine can be coupled to the lower arms of a three-point lifting hitch of the tractor.

Figure 7:
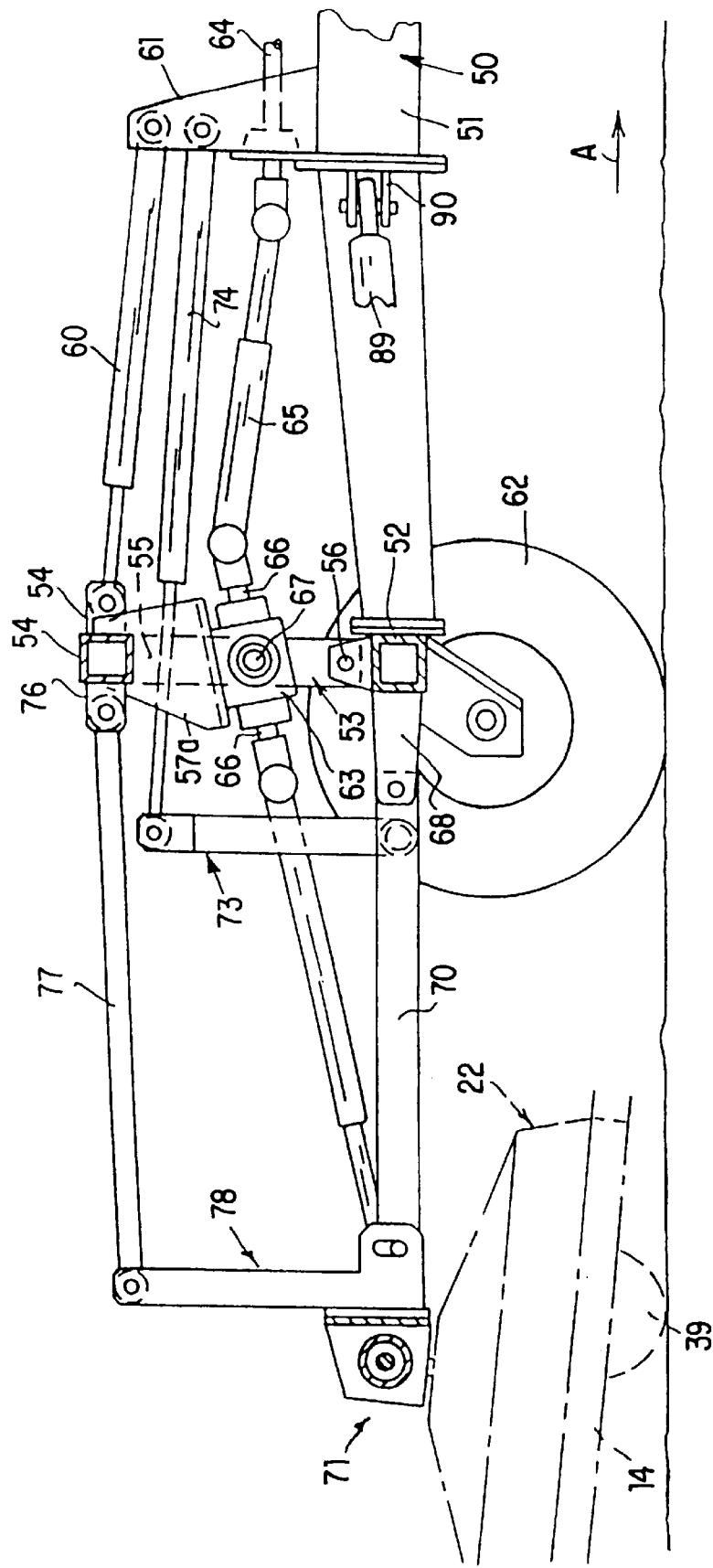
FIG. 7 is a side view of the machine according to the line VII—VII in FIG. 6.

As shown in FIG. 7, by means of a rod 60 which is adjustable in length, in this case constituted by a hydraulic piston and cylinder, and via a support 61 disposed on frame beam 51, trestle 53 is coupled with frame beam 51, so that the position of trestle 53 relative to frame beam 51 can be adjusted by a pivotal movement about the shafts 56. Adjusting rod 60 designed as a hydraulic piston and cylinder comprises a stop which is adjustable relative to the cylinder portion, said stop defining the most forward position of trestle 53 when the hydraulic piston and cylinder has been completely extended to the stop. By means of this adjustable stop the forwardly tilted operative position of the working members 29 and 30 is defined. For pivoting the machine into a transport position, trestle 53, or at least shafts 81 coupled thereto, are adjusted into a vertical position.

Frame 50 is supported by two supporting wheels 62 which, in this embodiment, are immovably coupled with frame beam 52 in the direction of travel, but which are capable of being steered, if desired, in a known manner, such as by means of steering swivel shafts. During operation, supporting wheels 62 are each located at least approximately directly under a frame beam 80 still to be described.

Trestle 53 is provided with a gearbox 63 disposed on the cross-beam 54, which gearbox 63 is capable of being coupled with an intermediate shaft 65 by means of an intermediate shaft 64 consisting of two parts, with the aid of which intermediate shaft 65 the gearbox 63 can be driven via the power take-off shaft of the tractor. Between frame beam 54 and gearbox 63 there is provided a console via which gearbox 63 is arranged at the height of the horizontal pivot shaft 82. The gearbox is disposed in such a manner that, in the transport position, its outgoing journals 66 extending in the direction of travel are tilted upwardly in forward direction at an angle corresponding to the angle at which working members 29 and 30 are tilted forwardly.

Gearbox 63 includes a drive shaft 66 extending rearwardly and, on both sides, drive shafts 67 extending sidewardly.

At the rear side of frame beam 52 are mounted connections 68, in the form of pairs of lugs. To connections 68 are coupled a forwardly projecting arm 70 of a frame 71 of the middle group of working members 14. At the end of arm 70, provided adjacent thereto, are coupling means for coupling with connections 68. Connections 68 extend rearwardly to such an extent that the horizontal pivot shaft, which couples a connection 68 with an arm 70, is located behind a corresponding horizontal pivot shaft in an upper connection 76. In this arrangement arms 70 are shorter than the arms 77. On one arm 70 or both arms 70 there is disposed, via a console, a common upper coupling point 73. Via a rod 74 capable of being adjusted in length, such as a hydraulic adjusting piston and cylinder, said coupling point 73 can be coupled to support 61 of frame 50.

On cross-beam 54 are disposed two connections 76 in the form of pairs of lugs for coupling arms 77 which are connected in a hinged manner to a trestle 78 of frame beam 51. Working members 14 are driven in a manner corresponding to that of the working members of the first embodiment and are pivoted upwardly by means of adjusting element 74 for being brought into the transport position.

Lifting of the rearmost group 22 by adjusting element 74, in particular for turning on the headland, has the effect that working members 14 are brought simultaneously from a forwardly tilted position into a position in which the lower ends of the tines of each working member 14 is located in an at least almost horizontal plane, i.e., a plane in which the rotation shafts are orientated vertically. This contributes to increasing the distance between the tines and the ground without a considerable increase of the transport height of central group of working members and facilitates pivoting of the outer working members 14 into their transport position.

Figure 8:
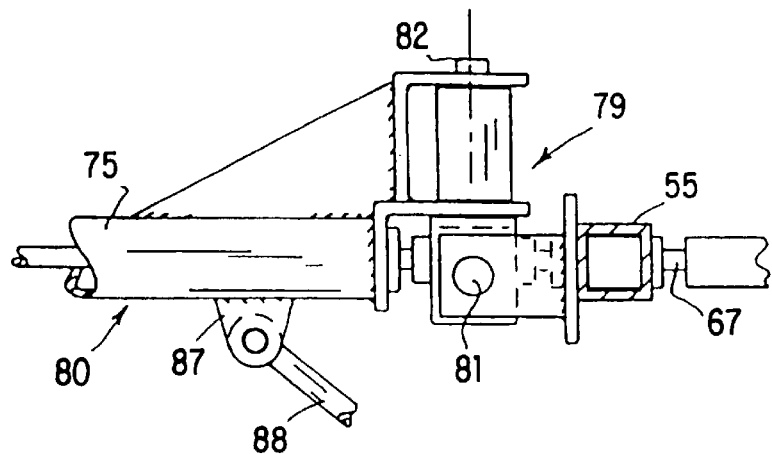
FIG. 8 is a view taken on the line VIII—VIII in FIG. 6.
Figure 9:
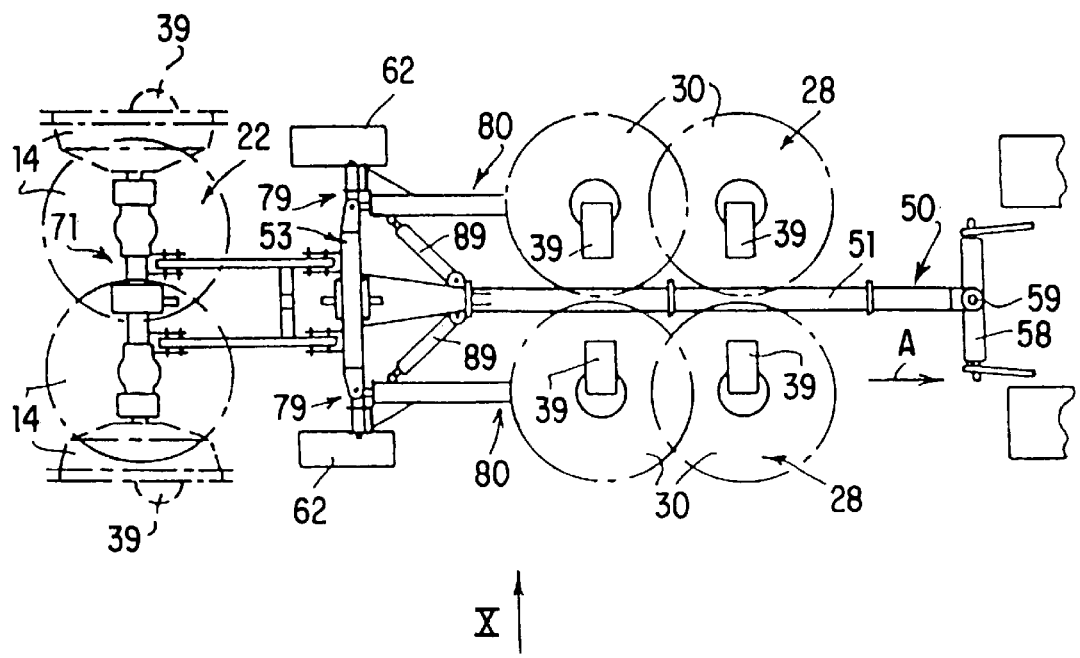
FIG. 9 represents, in a schematic plan view, the transport position of the machine according to the alternative embodiment.
Figure 10:
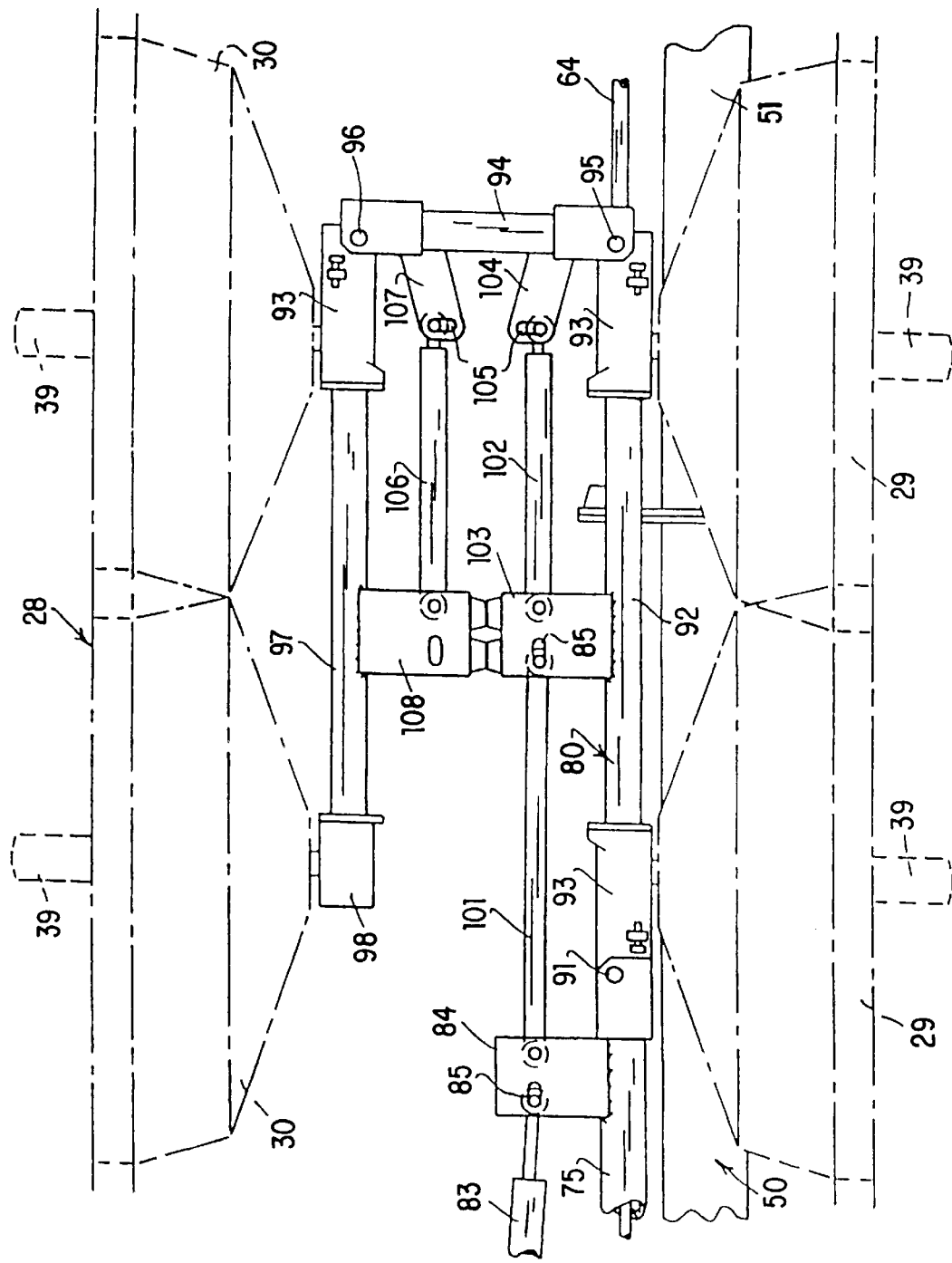
FIG. 10 is a view according to the arrow X in FIG. 9.

As shown more in detail in FIG. 8, on the outside of the upwardly extending beams 55, are connections 79 on which frame beams 80 are pivotally mounted about vertical shafts 81 and about horizontal shafts 82 for the groups of working members 28.

Horizontal shafts 82 extend in the direction of travel A, while vertical shafts 81 intersect a line extending at least substantially perpendicularly to the direction of travel A. In accordance with the invention, both shafts may virtually be produced as interrupted ones or via plural hinge point construction.

In the present embodiment, shaft 81 is an interrupted one constituting part of a forked element, so that the drive of working members 29 and 30 intersects the shaft 81. The drive shaft extending sidewardly, transversely to the direction of travel A, from central gearbox 63 is passed through a loop-shaped opening in trestle portion 53 and then extends in a straight line through frame beam 80. Relative to the direction of travel A, the horizontal shaft 82 is disposed behind the vertical shaft 81. To that end, frame beam 80, which is disposed in a straight line relative to frame beam 54, is provided with a console. As a result of the fact that gearbox 63 is coupled with frame beam 54, gearbox 63 pivots together with the frame beams and the working members into a forwardly tilted position. In the operative position, the shafts thereof which are orientated in the direction of travel extend substantially horizontally, which limits the wear of the universal joints of the drive.

Frame beams 80 are coupled with trestle 53 by means of hydraulic piston amnd cylinder adjusting elements 83 at the height of cross-beam 54 for automatically pivoting in height about shaft 82. For that purpose, each of frame beams 80 includes a projection 84 having a slot 85, in which the relevant end of an element 83 is capable of moving. Elements 83 are connected with trestle 53 by means of a coupling capable of movement in several directions, such as a ball-and-socket joint 86.

Each of frame beams 80 furthermore comprises a fastening facility 87 to which an adjusting element, in this case the piston rod 88 of a hydraulic adjusting piston and cylinder element 89, meshes in a hinged manner. The adjusting element 89 meshes in a hinged manner to a fastening facility 90 of frame beam 51. By means of adjusting elements 89, frame beams 80 are capable of pivoting forwardly in the direction of travel A relative to the central group of working member 14.

Frame beam 80 includes a frame beam 75 which is pivotable about horizontal shaft 82, to which frame beam 75 is fastened a pivotable frame beam 92 via a horizontal shaft 91. Via adjusting element 83 frame beam 75 is also connected with trestle 53. For that purpose there is provided an upwardly extending arm or console 84 is provided the upper side of frame beam 75. Arm 84 is a piece of plate material bent into a U-shape. The edges of the free ends of the U-shape are welded to frame 75. At approximately the same height, arm 84 is provided with a slotted hole extending substantially horizontally, indicated by the reference numeral 85, and a borehole, serving in this case for fittingly including a shaft extending in the direction of travel A, by means of which shaft a rod 101 is pivotally coupled with arm 84. Shaft 91, and together therewith the end of frame beam 75, extends transversely to the direction of travel A beyond the largest outline of the relevant outer working member 14 of central group 22. On said frame beams 92, under two gearboxes 93 included in the relevant frame beam 92 near the ends thereof, two working members 29 depend from each frame beam 92. At the free ends of frame beams 92, two intermediate arms 94 are pivotally mounted about horizontal shafts 95. At the outer end of an intermediate beam 94 a frame beam 97 is coupled about a horizontal shaft 96. In an analogous manner, working members 30 are mounted on the frame beams 97 via gearboxes 93 and 98.

The pivotal movement of the trestle 53 about shafts 56 has the effect that working members 14 of group 22, together with working members of the lateral groups 28, are brought into and out of a forwardly tilted position: pivot shaft 56, the pivot shafts at the ends of the arm 77 and the pivot shafts at the rear ends of the arms 70 form a parallelogram construction.

The adjusting elements 74 and 83 are mutually coupled so that, in one single control operation, all three groups of working members can be adjusted into a position in which they are lifted from the ground, such as turning on the headland. For a further pivotal movement into the transport position, in accordance with the preferred embodiment, trestle 53 has to be adjusted into a vertically orientated position in the embodiment shown by adjusting element 60.

Each intermediate arm 94 is capable of being adjusted by means of a preferably hydraulically powered adjusting element 102, which is coupled in a hinged manner with projection 103 and an arm 104 of frame beam 80 and the intermediate beam 94 respectively. Arm 104 is provided with a slot 105 which extends preferably substantially in the longitudinal direction of intermediate beam 94.

In an analogous manner, each intermediate arm 94 is coupled with a console, 108 of intermediate arm 94 and frame beam 97 respectively by means of a hydraulic piston and cylinder 106 and arms 107. Under each working members 29 and 30, is a located a running wheel 39 as also described in the previous embodiment. The horizontal upper surface of console 103 is provided with a few rubber knobs. Projection 103 is identical to arm 84, except that the horizontal upper surface is provided with a few rubber knobs. Console 108 corresponds to console 103, but is disposed in an inverted manner, i.e. having in the operative position the slotted hole on the outside and the borehole on the inside.

In the transport position, frame beam 97 bears on frame beam 92 via projections 108 and 103. A connecting rod 101 is pivotally connected with arm 84 about a horizontal shaft. Near its outer end connecting rod 101 is received in slotted hole 85 of console 103 so as to be movable therein about a horizontal pivot shaft. Adjusting element 106 may be replaced by a connecting rod which, near its inner and, is connected via a horizontal pivot shaft with the adjusting element 102 and an arm which is pivotally connected via a horizontal shaft with intermediate arms 94. Running wheels 39 of working members 14 of the central group are furthermore disposed so as to be pivotable about a substantially vertical shaft.

The function of the hay-making machine corresponds to that of the first embodiment. In the operative position the machine functions as a tedder.

Working members 14, 29 and 30 of all three groups are arranged in such a manner that the crop is treated on a continuous strip of soil. This implies that, seen in the direction of travel A, working member 29 located on the inside of the outboard group of working members 28 overlaps working members 14 located on the outside of the central group. This overlap is larger than the overlap of the working members within each group. The working members are capable of adapting themselves to the unevenness of the ground because the frame portions carrying working members are able to move relative to frame 50 about the various horizontal pivot shafts.

When the machine has to be adjusted into the transport position, first trestle 53 is pivoted rearwards about horizontal shafts 56 by means of hydraulic piston and cylinder unit 60, in such a manner that arms 55 assume a vertical position, or that the pivot shafts between the frame portions of frame beams 80 and 51 have been arranged at least substantially horizontally. Then, by an upward pivotal movement of the outer frame beams 97 about shafts 96 and subsequently of intermediate arm 94 about shaft 95, the outer working members 30 are positioned above the working members 29. Subsequently frame beams 80 are pivoted forwardly beside frame 50 about the vertical shafts 82 by means of the hydraulic pistons and cylinders 89 via piston rods 88. Afterwards the outer two working members of the central group 22 can be pivoted.

Figure 12:
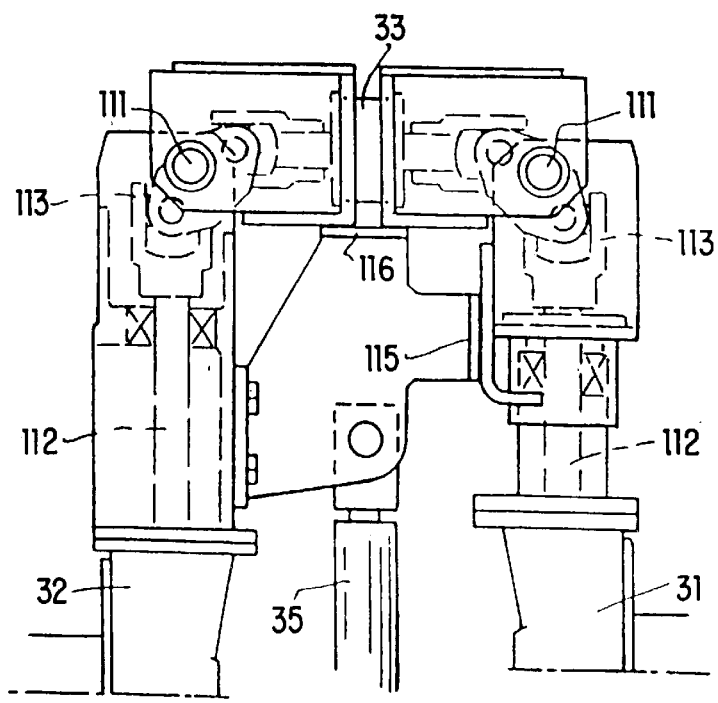
FIG. 12 shows the detail of FIG. 11 in the position of FIG. 3.

FIG. 12 shows in further detail how frame beam 32 is capable of being folded up on frame beam 31 and frame beams 31 and 32 (see FIG. 3) are pivotally fixed to each other by means of an intermediate arm 33. Said pivotal construction is not only suitable for a hay-making machine but also for other implements such as a weeder harrow so that this construction may constitute part of an agricultural machines. The application to a hay-making machine is, however, a particularly useful one because in that case, the tines mounted on the frame arms perform relatively quick circular movement which render the structure complex. In the vicinity of its respective ends, intermediate arm 33 carries pivot shafts 111 which, in the operative position of the agricultural machine, extend substantially horizontally and parallel to the direction of travel. Because, in the embodiment described, drive shafts 112 pass through the frame beams and the intermediate arms, a universal joint 113 is provided at each pivot shaft so that, notwithstanding the folded position of frame beam 32, the drive of all working members 30 is guaranteed. Frame beams 31 and 32 each carry two working members 29 and 30. This number may optionally be different. By means of the adjusting element 35, preferably constituted by a hydraulic piston/cylinder combination, the upward pivotal movement of intermediate arm 33 relative to frame arm 31 and the upward pivotal movement of frame arm 32 relative to intermediate arm 33 are controlled. One end of adjusting element 35 is mounted pivotally on frame beam 31 and the other end thereof is mounted pivotally on frame beam 32. The place where adjustment element 35 is mounted is relatively close to pivot shafts 111 of frame beam 31 and frame beam 32 respectively. Near its pivot shaft 111 frame beam 31 carries a stop means 114 including two stops 115 and 165 which mutually include an angle of substantially ninety degrees. In the unfolded position of frame beam 32 shown in FIG. 11, the stop 115 is faced away from frame beam 32 and stop 116 is facing adjusting element 35. As appears in particular from FIG. 12, in the completely folded position of frame beam 32 stop 116 rests against intermediate arm 33 and stop 115 will rests against the frame beam 31. Consequently, relative to adjusting element 35, stop means 114 pivots frame beam 31 about pivot shafts 111 through an angle of approximately one hundred, eighty degrees. Instead of a pivotal movement in upward direction about substantially horizontal pivot shafts 111, a pivotal movement in a forward or a rearward direction, relative to the direction of travel of the machine, about upwardly orientated pivot shafts 111 will be possible as well.

The intermediate arm 33 does not carry any working member such as a tedder or rake rotor. Said arm may carry a working member, if desired, but preferably it does not carry a working member of the type intended for the relevant agricultural machine. By "the type intended for the relevant agricultural machine" it is meant to refer to a tedder with a tedder member that rotates about an upwardly extending shaft, which rotor includes tedder tines arranged in a circle, but that does not exclude another working member, such as a fixed resilient tine of a weeder harrow, which may be fastened thereto.

In the manner described above, it is possible entirely to fold one frame beam 32 on the other frame beam 31 so that, in the folded position, said frame beams extend substantially parallel. "Folding" is meant to refer to the longitudinal sides of two adjacent frame beams being brought into a position in which they are facing each other, which may realized by pivoting an angle of, for example, one hundred, eighty degrees from the position in which said frame beams are in line although it is preferred that the angle of pivoting be at least approximately one hundred, sixty degrees.

Although we have disclosed the preferred embodiments of our invention, it is to be understood that it is capable of other modifications within the scope of the following claims:

What is claimed is:

1. A hay-making machine comprising a common frame on which are arranged three groups of motor-driven working members, each said member rotating about an upwardly oriented shaft, each said group of member arranged in a row extending transversely to the direction of travel of the machine, one of said groups being centrally located and the other said groups, viewed in the direction of travel of the machine, being located on each side of said centrally located groups, each of the other said groups being hingedably connected to said common frame so as to be foldable relative thereto about a substantially vertical axis and each of the other said groups including two subgroups which are foldable relative to the other subgroup of the same group about a substantially horizontal axis.

2. A hay-making machine as claimed in claim 1 wherein, viewed in the direction of travel of the machine, said centrally located group is located rearwardly of the other said groups.

3. A hay-making in accordance with claim 1 wherein each said group of working members comprises three working members, each of said other groups comprising hinged means between two of said working members of each respective other group whereby one of said working members in each of said other groups is pivotable into a transport position about said substantially horizontal axis and which extends in the operative direction of the machine, each of said other groups being pivotally attached to said frame so as to be pivotal about said substantially vertical axis in a forward direction so that the width of the machine is reduced.

4. An agricultural machine including a frame capable of being coupled to a tractor; said frame comprising hinge means, adjusting means, and two frame beams which are each pivotable about a respective relevant pivot shaft; a working member mounted from one of said frame beams; said relevant pivot shafts being spaced apart a fixed distance by an intermediate arm which is substantially shorter than either of said frame beams; said adjusting means comprising an adjusting element bridging said pivot shafts, movement of said adjusting element causing a pivotal movement about both of said relevant pivot shafts to take place.

5. An agricultural machine as claimed in claim 4 wherein said adjusting element comprises a linear drive.

6. An agricultural machine in accordance with claim 4 wherein said pivotal movement is approximately one hundred, eighty degrees.

7. An agricultural machine in accordance with claim 4 wherein said adjusting element comprises a piston and cylinder member wherein the length of the stroke of said of piston and cylinder member to cause said pivotal movement is approximately the same as the distance between said pivot shafts before said pivotal movement takes place.

8. An agricultural machine including a frame capable of being coupled to a tractor, said frame comprising hinge means and two frame beams which are respectively pivotal about a first pivot shaft and a second pivot shaft, an agricultural working member carried by one of said frame beams, said second pivot shaft extending substantially parallel to and spaced from said first pivot shaft, an intermediate arm connecting said two pivot shafts, said intermediate arm being free from agricultural working members; of the type intended for the agricultural machine.

9. A method of folding an agricultural machine comprising a frame on which is arranged a transversely extending group of working members, the method comprising folding part of said group of working members relative to the remaining part of said group of working members about an axis extending in the direction of travel the agricultural machine whereby the working width of the machine is reduced and then further folding said group of working members about a vertical axis whereby the working width of the agricultural machine is further reduced.

10. An agricultural machine including a frame capable of being coupled to a tractor, said frame comprising hinge means and a first frame beam and a second frame beam, at least at least one of said frame beams carrying a working member, said first frame beam being capable of being folded on said second frame beam by being pivoted about a pivot shaft located between said first frame beam, and said second frames beam a further pivot shaft being provided between said first frame beam, and said second frame beam said further pivot shaft being spaced a fixed distance from said first mentioned pivot shaft, said fixed distance being substantially less than the length of either of said first frame beam or said second frame beam, said first frame beam being pivoted about said further pivot shaft while being pivoted about said first mentioned pivot shaft, adjusting means for pivoting said first frame beam relative to said second frame beam, and stop means for limiting the pivoting of said first beam relative to said second beam to approximately one hundred, eighty degrees, said adjusting means being interconnected to said first frame beam via said stop means.

11. An agricultural machine in accordance with claim 10 said stop means limiting the angle of pivoting of said first mentioned pivot shaft to approximately ninety degrees.

12. An agricultural machine in accordance with claim 11 wherein said stop means have limits the angle of pivoting of each said pivot shaft to approximately ninety degrees.

13. An agricultural machine in accordance with claim 12 wherein said stop means is connected to said first frame beam and includes a first stop and a second stop which are disposed approximately ninety degrees apart.

14. An agricultural machine in accordance with claim 13 wherein said first stop extends substantially parallel to said first frame beam.

15. An agricultural machine in accordance with claim 14 wherein said second stop is between said first stop and said first frame beam.

16. An agricultural machine in accordance with claim 10 wherein said first frame beam is capable of being folded on said second frame beam so that said frame beams are substantially parallel.

17. An agricultural machine in accordance with claim 10 wherein said working member is carried by said first frame beam, said working element being driven by a mechanical drive element which extends through said first and second frame beams.

18. An agricultural machine in accordance with claim 10 wherein said mechanical drive element comprises a drive shaft, said drive shaft comprising a universal joint which is proximate said first mentioned pivot shaft and said further pivot shaft.

19. An agricultural machine in accordance with claim 10 wherein said first mentioned pivot shaft and said further pivot shaft extends substantially horizontally and substantially parallel to the usual direction of travel of the machine during operations of the machine.

20. An agricultural machine in accordance with claim 10 which comprises another pivot shaft, said first frame beam, said second frame beam, said first mentioned pivot shaft and said further pivot shaft all being pivotable together relative to said another pivot shaft.

21. An agricultural machine in accordance with claim 20 wherein said another pivot shaft is orientated substantially vertically.

22. An agricultural machine in accordance with claim 10 wherein said working member comprises a component selected from a group consisting of a tedder, a raking member, or a weeder member.

23. An agricultural machine in accordance with claim 10 wherein said working member comprises an upwardly orientated shaft and is rotatable about said shaft.

24. An agricultural machine as claimed in claim 10 wherein said working member comprises hay moving means which perform the function of hay-making.

25. A hay-making machine comprising a frame, three groups of motor-driven working members arranged on said frame, said working members of said groups being rotatable about upwardly orientated shafts, each of said groups being operatively disposed transversely to the normal direction of forward travel of the machine, said groups comprising a central rear group and two outer groups which, viewed in the direction of travel, extend laterally one from each side of said central rear group, each of said outer groups comprising four working members, adjusting means for adjusting said working members into a transport position wherein at least one working member of an outer group is pivotable upwardly into a transport position about a substantially horizontal shaft extending substantially in the machine's normal direction of forward travel while each of said outer groups are pivotable in said direction about a vertical shaft whereby the width of the machine is reduced.

26. A hay-making machine in accordance with claim 25 wherein said vertical shafts about which said other groups are pivotable is located at the side of said other groups facing said frame.

27. A hay-making machine in accordance with claim 25 wherein each said outer group comprises a connecting element between adjacent working members, each said connecting member comprising a substantially horizontal shaft about which the outermost said working member of each said outer group is upwardly pivotable.

28. A hay-making machine in accordance with claim 27 wherein each said outer group comprises four working members and the two outermost working members of each said outer group are positionable via said connecting element over another two said working members of such outer group.

29. A hay-making machine in accordance with claim 25 wherein said central rear group comprises three of said working members, an outboard member of which is pivotable in an upward direction about an axis extending in said direction.

30. A hay-making machine in accordance with claim 25 wherein said central rear group comprises three said working members which have a gearbox connected thereto, said gearbox having a drive which is connectable to said working members of said outer groups.

31. A hay making machine in accordance with claim 25 wherein said central rear group comprises two working members, said two members comprising rotating rake wheels which are driven to rotate in a forward direction along their adjacent sides which face each other when the machine is engaged in forward travel.

32. A hay-making machine in accordance with claim 25 wherein said central rear group comprises an even number of working members, adjacent working members of each of said groups rotating in opposite directions and the working members which are farthest outboard in said central rear group rotating in directions opposite to the working members which are inboard of said outer groups working members, the arrangement being that the machine functions as a tedder.

33. A hay-making machine in accordance with claim 25 wherein, viewed from the side, said central rear group is disposed at the rear of said two outer groups.

34. A hay-making machine in accordance with claim 25 which comprises supporting wheels, said supporting wheels having horizontal axes of rotation which substantially intersect the vertical axes of rotation of said working members in said two outer groups.

35. A hay-making machine in accordance with claim 25, comprising supporting wheels which are forward of said central group and laterally inboard of outer groups.

36. A hay-making machine in accordance with claim 25 comprises supporting wheels which are sufficiently adjustable in height to lift said working members from the ground when in the transport position.

37. A hay-making machine in accordance with claim 25 comprising an upright trestle, said central rear group of working members being disposed on said upright trestle.

38. A hay-making machine in accordance with claim 25 wherein said frame comprises an upright trestle, coupling elements which pivot about pivot shafts extending transversely to the machine's normal direction of forward travel connecting said upright trestle to said central rear group of working members.

39. A hay-raking machine in accordance with claim 34 wherein said frame comprises a trestle, said trestle being disposed substantially over said horizontal axes.

40. A hay-making machine in accordance with claim 25 comprising a trestle mounted on said frame, the upper aspect of said trestle being spaced above said frame.

41. A hay-making machine in accordance with claim 40 comprising hydraulic and piston means connected to said trestle for vertically adjusting the height of said central rear group of working members relative to the ground.

42. A hay-raking machine in accordance with claim 25 comprising hydraulic piston and cylinder means interconnecting said outer groups of working members and said frame so that said outer groups are working members are each pivotal in height relative to said frame about a pivot shaft.

43. A hay-making machine in accordance with claim 25 where it said frame comprises a hinge means for each said outer group of working members, each said hinge means having a horizontal axes of rotation which substantially intersect vertical axes of rotation of said vertical shafts.

44. A hay-making machine in accordance with claim 25 comprising supporting wheels for said frame which are disposed forward of said central rear group and inboard of each of said two outer groups, end means associated with said supporting wheels for adjusting the height of said frame relative to the ground.

45. A hay-making machine in accordance with claim 25 wherein each of said groups of working members is provided with a separate drive, each of said drives being provided with an overload clutch.

46. A hay-making machine in accordance with claim 25 comprising a gearbox for driving said working members, said gearbox including connection means for operative coupling of said gearbox to a power take-off shaft of a tractor which tows the hay-making machine.

47. A hay-making machine in accordance with claim 46 wherein said gearbox comprises three outwardly extending shafts, two of said shafts extending transversely to the machine's normal direction of forward travel which are connectible to drives for said outer groups of working members and the third of said shafts extending rearwardly, said third shaft being connectible to said working members of said central rear group of working members.

48. A hay-making machine in accordance with claim 47 wherein each of said three outwardly extending shafts is provided with an overload clutch.

49. A hay-making machine in accordance with claim 25 wherein each of said working members is provided with a supporting wheel.

50. A hay-making machine in accordance with claim 49 wherein said supporting wheels are fixed relative to machine's normal direction of forward travel.

51. A hay-making machine in accordance with claim 49 wherein said supporting wheels are self-adjusting running wheels.

52. A hay-making machine in accordance with claim 25 wherein the working width of the machine is at least twelve meters and the transport width of the machine is not more than about three meters.

53. A hay-making machine in accordance with claim 25 wherein said shaft extending substantially in the machine's normal direction of forward travel is disposed at an upwardly orientated angle to the horizontal.

\* \* \* \* \*